Sept. 1, 1925.
M. F. EDWARDS
BODY TIPPING APPARATUS FOR MOTOR ROAD VEHICLES
Filed Oct. 19, 1923 2 Sheets-Sheet 1
1,552,281
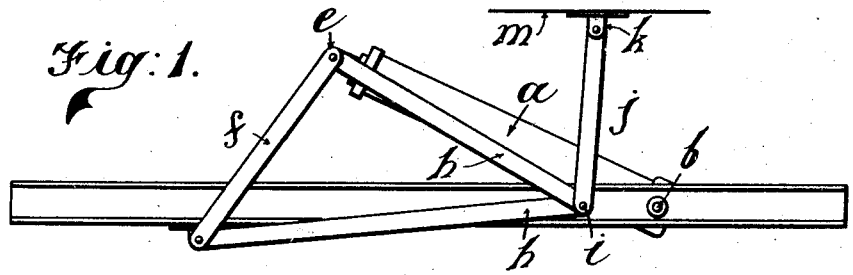
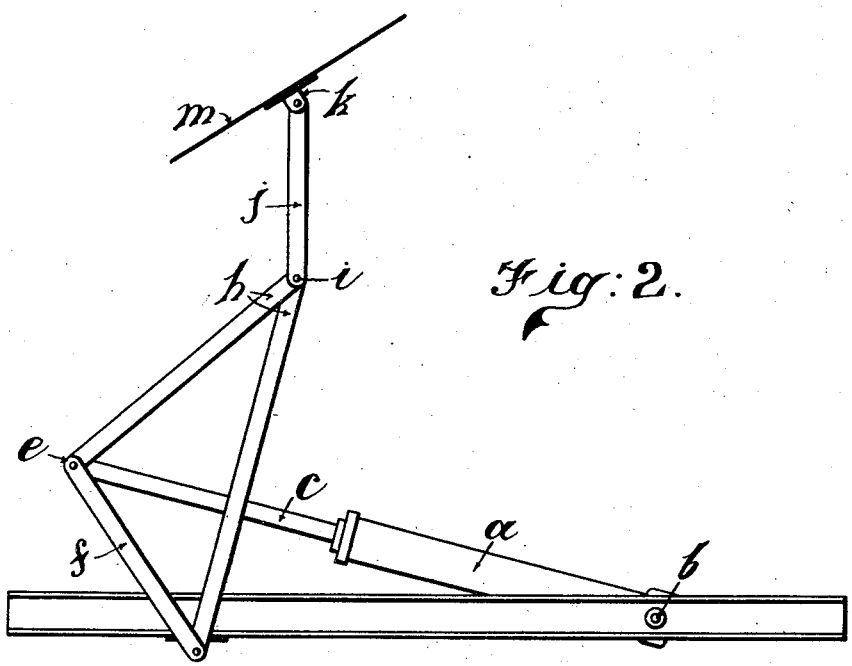
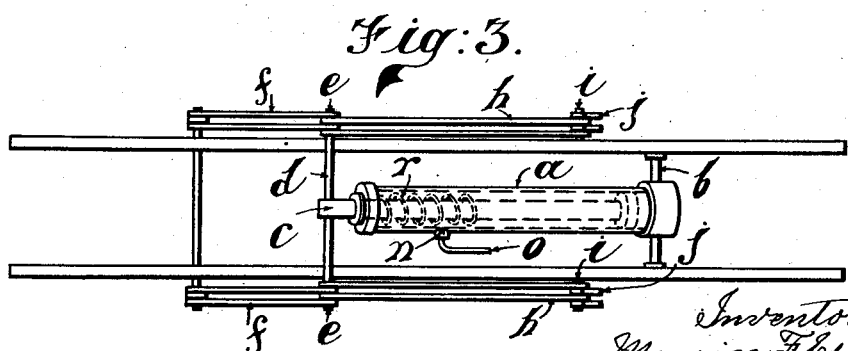

Sept. 1, 1925.

M. F. EDWARDS 1,552,281

BODY TIPPING APPARATUS FOR MOTOR ROAD VEHICLES

Filed Oct. 19, 1923     2 Sheets-Sheet 2

Inventor.
Maurice F. Edwards,
by Herbert W. Jenner,
Attorney.

Patented Sept. 1, 1925.

1,552,281

UNITED STATES PATENT OFFICE.

MAURICE FRED EDWARDS, OF BOLTON, ENGLAND.

BODY-TIPPING APPARATUS FOR MOTOR ROAD VEHICLES.

Application filed October 19, 1923. Serial No. 669,500.

*To all whom it may concern:*

Be it known that I, MAURICE FRED EDWARDS, a subject of the King of Great Britain and Ireland, and resident of Bark Street, Bolton, England, have invented certain Improvements in Body-Tipping Apparatus for Motor Road Vehicles, of which the following is a specification.

This invention relates to improvements in body tipping apparatus for motor road vehicles, the object being to provide an improved and simple construction of that type of apparatus which is operated by liquid pressure.

With the aforesaid object in view my invention consists essentially in an operating cylinder pivoted by one end to the chassis frame of the vehicle, a ram within the cylinder having its outer end coupled to systems of pivoted levers, said levers being also coupled by links to the underside of the tipping body. My invention likewise embraces a modified form of the apparatus in which the systems of pivoted levers instead of being connected to the underside of the tipping body by links, carry rollers adapted to roll in slideways connected to the underside of the tipping body. A further feature of my invention comprises the provision of a spring or springs located in a suitable part of the apparatus and adapted to be compressed or to be extended as the body of the vehicle is being tipped, so as to re-act to pull the body back again after the load has been discharged.

My invention will be fully described with reference to the accompanying drawing in which, Fig. 1, is a side elevation of a tipping apparatus constructed in accordance with my invention, showing the parts in the position they assume when the tipping body is horizontal.

Figure 4:
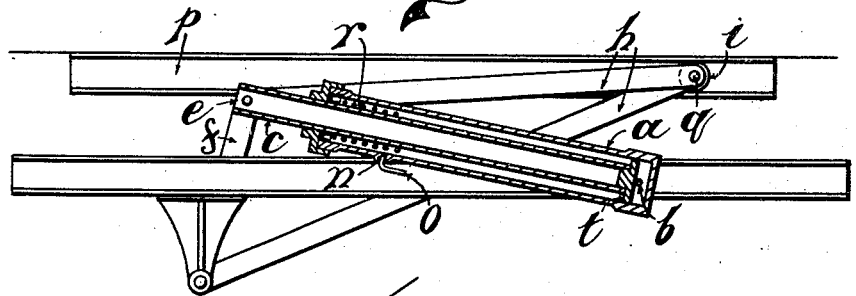
Figure 5:
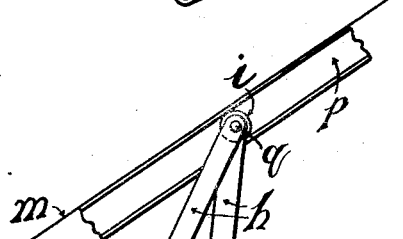
Figure 6:
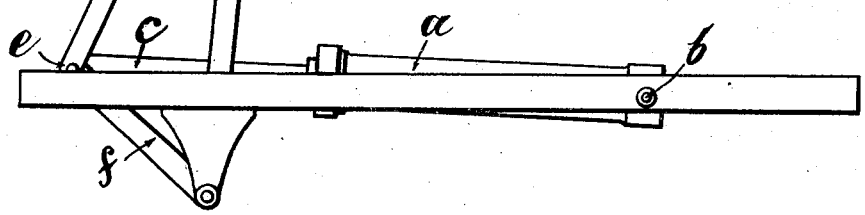

Fig. 2 is a similar view showing the body raised. Fig. 3 is a plan view of the parts shown in Fig. 1. Fig. 4 is a side view showing a modification with the body lowered. Fig. 5 is a side view of the same modification but shows the body raised. Fig. 6 is a plan view of the parts shown in Fig. 4.

In accordance with my invention I employ a cylinder $a$ conveniently pivoted as by trunnions $b$ at one end either directly to the chassis of the road vehicle or to a frame conveniently fixed thereto, such cylinder being provided with a ram $c$ which is preferably, though not necessarily, packed to make it liquid-tight with the wall of the cylinder at its inner end, by any form of suitable packing. The outer end of the ram extends from the cylinder and is coupled to a cross head $d$ to form a wide bearing at two points $e$ in the systems of pivoted levers $f$, the pivotal points of said levers being also on the chassis frame or on the frame fixed thereto and somewhat in advance of and below the point at which the ram is pivoted to the same levers. The rear ends $h$ of the levers extend to the rear of the cross head of the ram and are coupled at $i$ to the lower ends of a pair of links $j$, the upper ends of which, are in turn, coupled to brackets $k$ secured to the underside of the tipping body $m$ which latter is pivoted to the chassis frame in the known way. The levers are each formed of bars arranged in the form of a scalene triangle having the right angle at its top. The ram is pivotally connected with the bars at the tops of the triangles. Each triangle has the bar which forms its hypotenuse or base pivoted to the supporting frame at one end, and its other end is pivotally connected with the tipping body.

Oil or other suitable fluid for operating the ram is led to the lower end of the cylinder in any suitable and known way, but preferably by forming the pivot of the cylinder or trunnion $b$ hollow and coupling the liquid supply pipe thereto, the other end of the pipe being connected to the usual source of liquid power supply. The pipe is provided with a controlling valve in the known way. In action the liquid forces the ram forward and through the pivoted levers and links raises the pivoted body of the vehicle to tip the load from the horizontal position shown in Fig. 1 to the inclined position shown in Fig. 2. After tipping, the body is lowered by operating the valve on the supply pipe in the known way so as to allow the liquid to pass back to the source of supply.

In order to prevent the tipping body being raised too far a port is formed at the outer end of the cylinder at $n$ so that when the inner end of the ram passes the port the liquid discharges through it into a pipe $o$ leading back to the source of liquid supply so long as the operating pump is in action, but immediately the pump stops the ram recedes a little and covers the port, the lowering of the body being effected in the manner already described.

The modified arrangement indicated in Figs. 4 to 6 consists in dispensing entirely with the links $j$ and providing the system of pivoted levers $f$ with rollers on the centres $i$, such rollers co-acting with slides or guideways $p$ preferably in the form of channel members secured to the underside of the tipping body. The rollers are supported upon a shaft $q$ or on studs secured in the ends of the levers $f$. The action of this modified arrangement is that as the rear ends of the levers $f$ are raised by the ram the rollers travel along the channel members and at the same time tip the body as indicated in Figs. 4 and 5 of the drawings.

A further feature of my invention consists in the provision of means for assisting in the return of the tipping body to the horizontal position after tipping, such means consisting of a spring or springs located in a suitable part of the apparatus and adapted to be compressed or to be extended as the body is being tipped so as to re-act to pull the body back again after the load has been discharged. In the simplest form of my invention I arrange to locate a spring $r$ within the ram cylinder $a$ and around the ram $c$ bearing by its outer end against the inside of the cylinder cover or the integral end of the cylinder as the case may be as shown in Figs. 3 and 4. The spring may be merely placed freely on the ram and between it and the inside of the cylinder. In the arrangement described when the ram is approaching the end of the outward stroke the inner end of the spring is engaged by the shoulder or flange $t$ of the ram so as to compress the spring between such shoulder and the end of the ram cylinder so charging it ready for re-acting to return the ram to initial position and consequently the tipping body controlled by it.

In a modification of the arrangement described one or more springs may be connected to one of the systems of levers $f$ or to both systems as the case may be and to the chassis and be extended during the tipping so as to retract after that operation.

What I claim as my invention and desire to secure by Letters Patent is:—

In a tipping truck, a main frame, a tipping body, a frame having the form of a scalene triangle with its right angle arranged at its top, said triangular frame having the end of its base at the end of its shortest side pivoted to the main frame, and having the other end of its base operatively connected with the said body, and a cylinder for tipping the body pivoted to the main frame and provided with a ram which is pivoted to the top of the pivoted triangular frame.

In testimony whereof I have hereunto set my hand.

MAURICE FRED EDWARDS.